United States Patent
Drda

(10) Patent No.: US 6,387,266 B1
(45) Date of Patent: May 14, 2002

(54) METHOD OF SEWAGE BIOLOGICAL PURIFICATION AND AN EQUIPMENT FOR PERFORMING THIS METHOD

(75) Inventor: Milan Drda, Mladá Vožice (CZ)

(73) Assignee: Envi-Pur, s.r.o. (Ltd.), Tábor (CZ)

( * ) Notice: Subject to any disclaimer, the term of this patent is extended or adjusted under 35 U.S.C. 154(b) by 0 days.

(21) Appl. No.: 09/565,472

(22) Filed: May 5, 2000

(30) Foreign Application Priority Data

Oct. 19, 1999 (CZ) .......................................... 1999-3705

(51) Int. Cl.[7] .................................................. C02F 3/20
(52) U.S. Cl. .................... 210/608; 210/626; 210/195.3; 210/197; 210/220
(58) Field of Search ................................ 210/608, 623, 210/626, 195.3, 195.4, 197, 202, 220

(56) References Cited

U.S. PATENT DOCUMENTS

| | | | |
|---|---|---|---|
| 3,537,583 A | * 11/1970 | Wahner | 210/626 |
| 4,006,085 A | * 2/1977 | Matteson | 210/197 |
| 4,585,556 A | * 4/1986 | Machrle et al. | 210/608 |
| 4,596,658 A | * 6/1986 | Mandt | 210/195.3 |
| 4,655,925 A | * 4/1987 | Tabata et al. | 210/605 |
| 4,950,396 A | * 8/1990 | Skaar et al. | 210/195.3 |
| 4,952,316 A | * 8/1990 | Cooley | 210/626 |
| 4,966,705 A | * 10/1990 | Jamieson et al. | 210/195.3 |
| 5,217,609 A | * 6/1993 | Holdeman | 210/195.3 |
| 5,234,580 A | 8/1993 | Thomas | |
| 5,275,732 A | 1/1994 | Wang et al. | |
| 5,744,037 A | 4/1998 | Fujimura et al. | |
| 5,888,394 A | * 3/1999 | Jan | 210/195.3 |
| 5,908,554 A | * 6/1999 | Tholander et al. | 210/195.3 |

FOREIGN PATENT DOCUMENTS

| | | |
|---|---|---|
| CZ | 6698 | 10/1997 |
| DE | 2136871 | 2/1973 |
| EP | 0968965 | 1/1994 |
| GB | 1354126 | 6/1994 |
| WO | 9418131 | 8/1994 |

OTHER PUBLICATIONS

Registration of Ownership transfer for CZ6698.

* cited by examiner

Primary Examiner—Christopher Upton
(74) Attorney, Agent, or Firm—Stevens, Davis, Miller & Mosher, LLP

(57) ABSTRACT

A method of biological sewage purification based on that during the purification process the separated water is in determined intervals pumped off from the separation process and the sedimentation is interrupted by its intensive stirring whereupon the sedimentation continues. For this purpose the equipment is equipped with the source of intensive stirring (17) arranged in the feeding tank (6) and the pump (25) for lowering the operating level (19) in the tank (1) before interrupting the sedimentation.

15 Claims, 4 Drawing Sheets

METHOD OF SEWAGE BIOLOGICAL PURIFICATION AND AN EQUIPMENT FOR PERFORMING THIS METHOD

FIELD OF THE INVENTION

The present invention relates to a method of biological purification of sewage during which the purified sewage after its mechanical pre-treatment is subjected to the process of biological removal of pollution with activated sludge under aerobic and/or anoxidic and/or anaerobic conditions with following sedimentation and at that the activated sludge comes back into the purification process and its excess is carried away this process.

The invention also relates to an equipment for performing this method which includes a basket for mechanical pre-treatment with a pre-connected inlet of purified sewage, an activation space with aerating elements, a feeding tank with a feed roll, a recirculation sludge pump for pumping the activated sludge from the feeding tank bottom into the inlet zone of the activation space and the purified sewage withdrawal.

BACKGROUND OF THE INVENTION

It is known that there exist a method of biological sewage purification during which the purified sewage after its mechanical pre-treatment is subjected to the process of biological removal of pollution with activated sludge under aerobic and/or anoxidic and/or anaerobic conditions with following sedimentation and at that the activated sludge comes back into the purification process and its excess is carried away this process.

The mentioned method is applied in various sewage treatment plants from small domestic sewage plants up to sewage treatment plants for higher numbers of equivalent residents.

It is known that when applying this method, i.e. during operation of these sewage treatment plants, floating impurities and the activated sludge are flooded up on the level of the feeding tank during sedimentation. This phenomenon is frequent mainly in smaller sewage treatment plants for the reason of considerable irregularity of hydraulic load. Removing of floating impurities and sludge is often solved in larger sewage treatment plants with the aid of a special equipment that wipes off or pumps these impurities from the level of the feeding tank.

In smaller sewage treatment plants where the occurence of these undesirable effects is frequent and quantities of floating impurities and sludge are considerable the equipment for removing of floating impurities and sludge is missing as a rule for economic reasons and removing of these impurities and sludge is solved manually as a rule. When removing it is necessary together with floating impurities to remove also the floating sludge which is as a rule several times more than floating impurities or it is necessary to mix off mechanically the gaseous phase from the float out activated sludge and thus to separate the float sludge from the system of sewage purification from floating impurities what considerably reduces the quantity of impurities necessary to remove form the level of the feeding tank.

This method of removing of floating impurities is considerably time demanding and during stirring the floating activated sludge and simultaneous feeding of purified sewage this activated sludge leaks into the outlet what considerably deteriorates the resulting parameters of the purified sewage.

In systems of sewage purification when for sedimentation of activated sludge the vertical feeding tank is used it is also necessary to remove manually the floating impurities from the feed roll placed in the feeding space.

Also in this feed roll the floating impurities together with the float out activated sludge are catched what also increases the quantity of matters that must be removed from the system.

The invention sets as a goal to remove or at least to considerably limit the above mentioned insufficiencies.

SUMMARY OF THE INVENTION

The substance of the biological method of sewage purification during which the purified sewage after its mechanical pre-treatment runs through the purifying process of biological removal of pollution with activated sludge under aerobic and/or anoxidic and/or anaerobic conditions with following sedimentation of the mixture of purified sewage and activated sludge for the purpose of separation and at that the activated sludge comes back into the purification process and the possible excess of the sludge is carried away the purification process and the separated water leaves the purification process, according to the invention consists in it that during the purification process the separated water in determined time intervals is pumped off from the separation process and the sedimentation of the remained part is subsequently interrupted by its intensive stirring whereupon the sedimentation process continues.

A further feature of this method is that the quantity of water pumped in determined time intervals corresponds approximately to the expected spasmodic feeding of purified sewage into the purification process during the time of pumping of sewage from the feeding space, intensive stirring, and subsequent stabilization of the purification process.

From the point of view of achieving the exceptionally good purification effect it is advantageous if after interruption of sedimentation the floating impurities are sucked off from the level of separated sewage and further on that the sucked floated impurities come back into the activating purification process.

The substance of the equipment for performing the method according to the invention that includes in the tank, in its inlet zone, the basket for mechanical pre-treatment with a pre-connected inlet of purified sewage, the activation space with aerating elements, the feeding tank in which the feed roll connected by the feed adapter to the activation space is arranged, further on the recirculation sludge pump for pumping the activated sludge from the feeding tank bottom into the inlet zone and the purified sewage withdrawal consists in it that the feeding tank is equipped or connected to the source of intensive stirring of its content, that the feeding tank is connected to the pump for lowering the operating level whose outlet is mouthed in the withdrawal and that in the feeding tank the suction branch is arranged for sucking off the floating impurities from its lowered level, connected to the suction pump whose outlet is mouthed above the level of the inlet zone.

Advantageous is a design where the pump for lowering the operating level, the source of intensive stirring of the feeding tank content, the suction pump, and the recirculation sludge pump are designed as air-lift pumps.

A further feature is that the inlet zone in which the basket for mechanical pre-treatment is arranged is spacially delimited by the dipping wall.

Another feature is that in the inlet part of the purified sewage withdrawal mouthed into the outlet space the spillway is made delimiting the height of the operating level behind which the pump outlet for lowering the operating level is mouthed and at that the outlet space is delimited by a part of the feeding tank jacket equipped with passage, the slanting wall and the side walls.

For achieving a reliable performance of the purification process a design is advantageous according which the source of intensive stirring of the feeding tank content, the recirculation sludge pump, the pump for lowering the operating level, and the the suction pump are connected to the air distributor connected with the pressure air source and at that the air distributor and the pressure air source are controlled by a programmable control unit.

DESCRIPTION OF THE DRAWINGS

The invention is subsequently described in more details with reference to the accompanying drawings, wherein.

DESCRIPTION OF THE PREFERRED EMBODIMENTS

Figure 1:
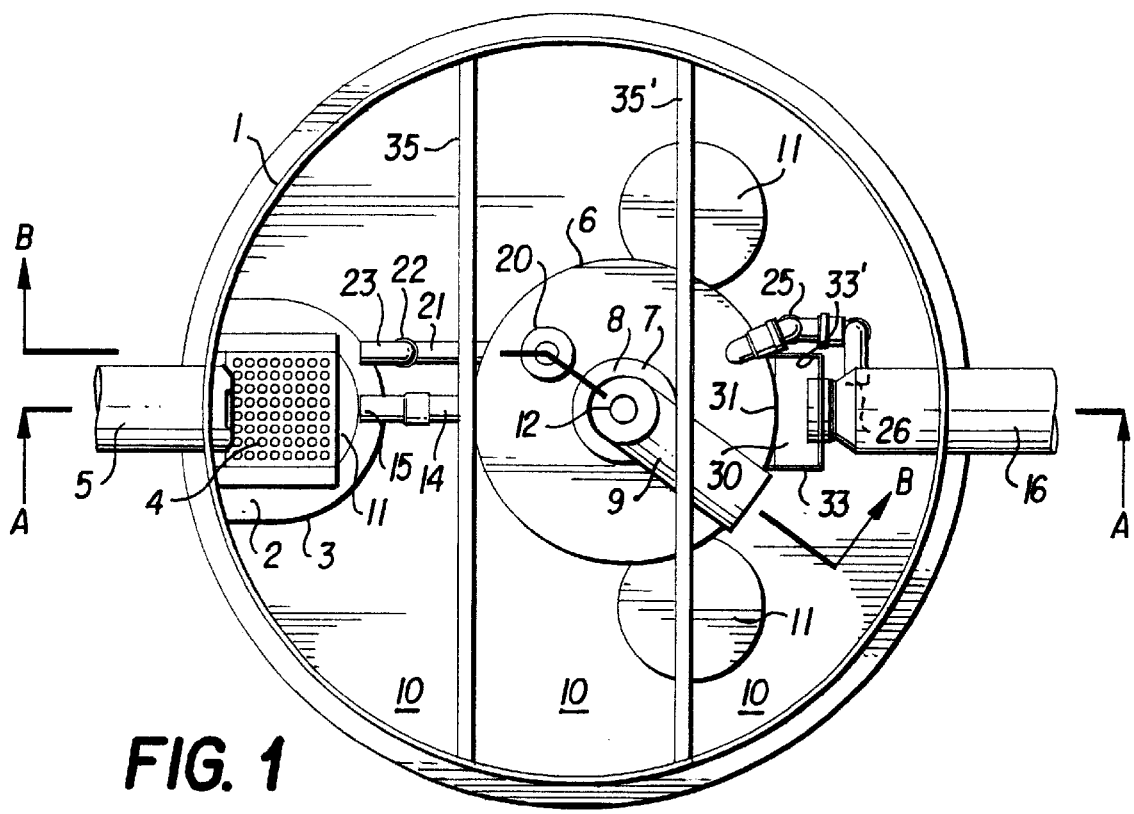
FIG. 1 shows a biological sewage treatment plant in a schematic ground plan without the cover in the design suitable for use as a domestic sewage treatment plant.

In the tank 1 in its inlet zone 2 delimited by the dipping wall 3 the basket 4 for mechanical pre-treatment of purified sewage entering into it by means of the admission 5 is arranged.

Figure 3:
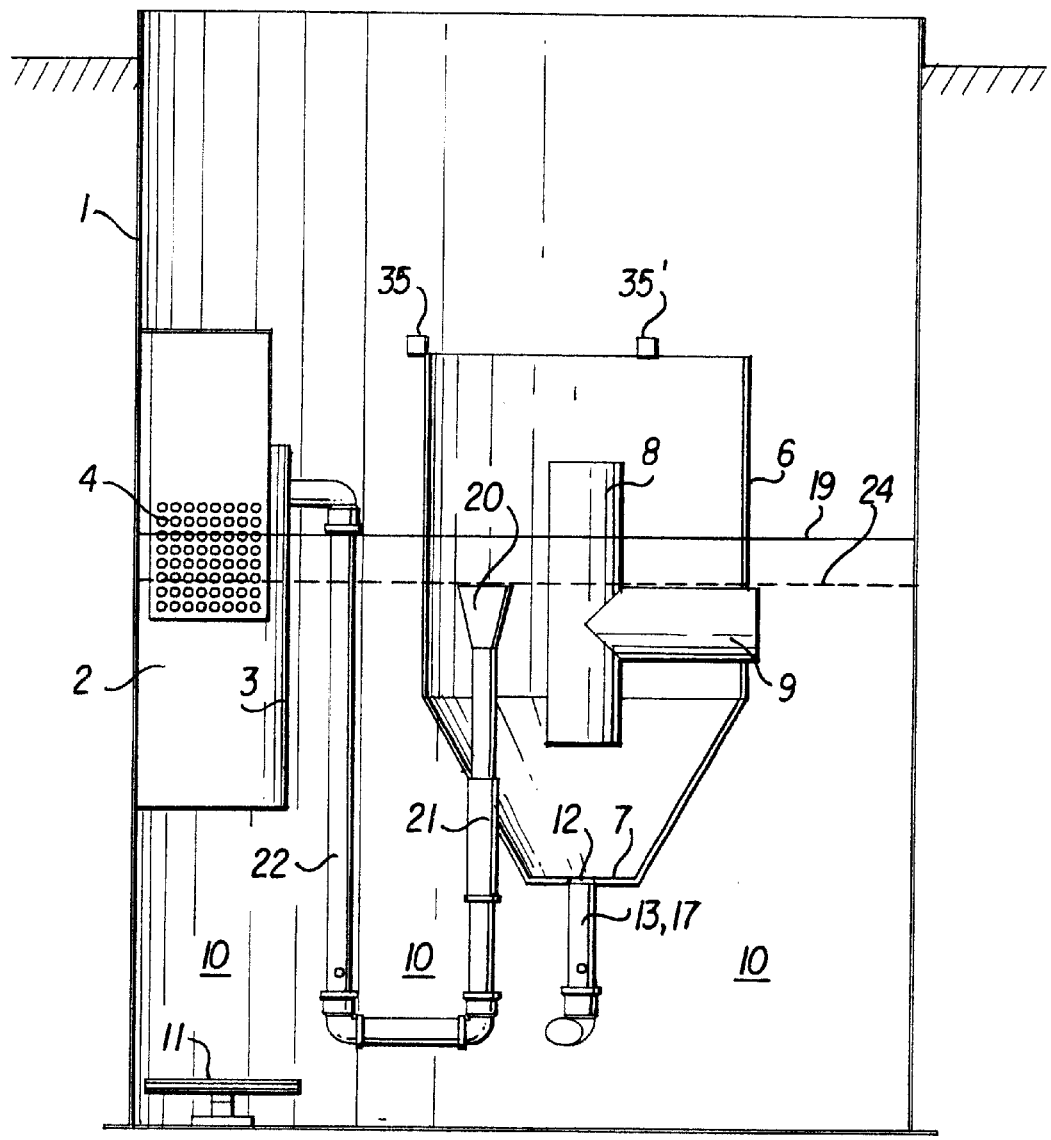
FIG. 3 shows a section of the sewage treatment plant indicated in FIG. 1 in the B—B sections, without illustrating the outlet part and the pump for interrupted lowering of the level.
Figure 5:
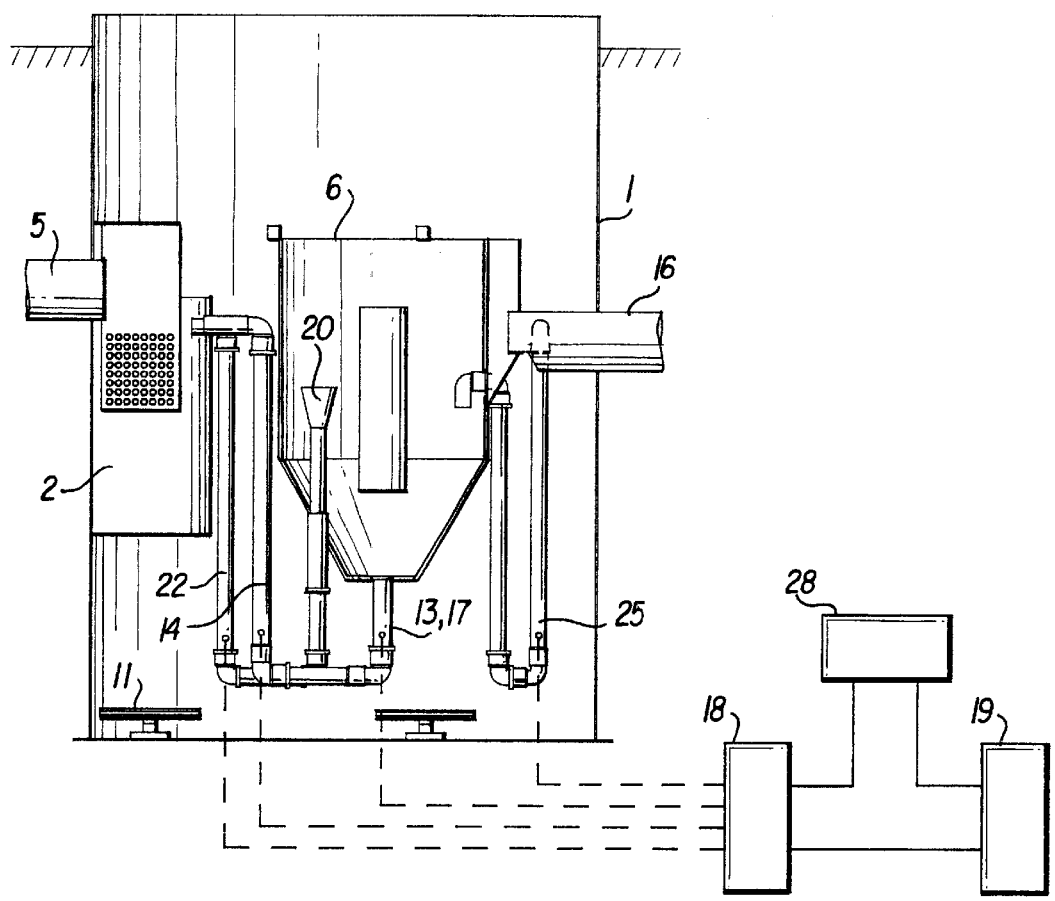

Further on in the tank 1 the feeding tank 6 with the bottom 7 is placed. In the feeding tank 6 the feed roll 8 with the feed adapter 9 is placed, see FIG. 3, that is mouthed into the activation space 10 of the tank 1 in the lower part of which the aerating elements 11 are situated connected to the non-illustrated source of pressure air. In the bottom 7 of the feeding tank 6 the opening 12 is made to which the sludge pipeline 13 is connected connected to the recirculation sludge pump 14 the outlet branch 15 of which leads above the level of the inlet zone 2. The recirculation sludge pump 14 is with an advantage made as an air-lift one connected, as indicated in FIG. 5, to the air distributor 18. The purified sewage withdrawal 16 serves for draining the purified water from the feeding tank 6. The described arrangement is well-known in general.

According to the invention the feeding tank 6 is equipped or in the given example connected to the source of intensive stirring of its content but only in determined rather short intervals what will be described hereinafter.

The source of intensive stirring 17 is arranged with an advantage directly in the sludge pipeline 13 in the form of the air-lift pump with air supply connected to the air distributor 18 shown in FIG. 5. It can be made also as a mechanical stirrer situated directly in the feeding tank 6 or as an ejector and the like.

In the feeding tank 6 under the level of the operating level in the level of the lowered level 24 the suction branch 20 is arranged connected through the suction pipe 21 getting through the feeding tank wall 6 to the suction pump 22 whose outlet 23 leads above the level of the inlet zone 2.

The feeding tank 6 is connected also to the pump 25 for lowering the operating level 19 to the level of the lowered level 24 and at that the pump outlet 26 of this pump is mouthed into the withdrawal 16 and its inlet 27 is arranged slightly under the lowered level 24. With an advantage there is also the pump 25 for lowering the operating level 19 in the feeding tank 6 and thus also in the tank 1 as a whole made also as the air-lift pump that is connected to the air distributor 18 as shows FIG. 5.

Figure 4:
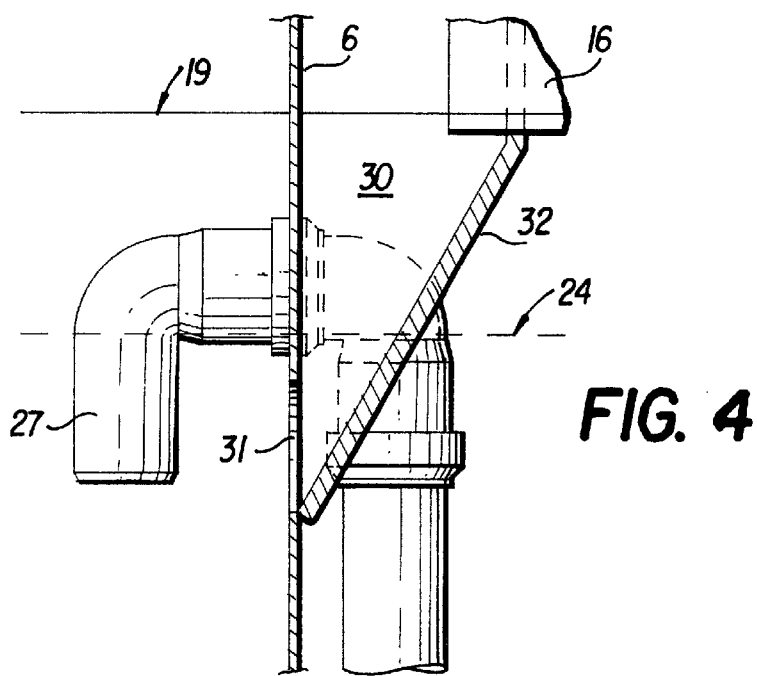
FIG. 4 shows an enlarged detail D indicated in FIG. 2 and FIG. 5, a section of the sewage treatment plant indicated in FIG. 2 with schematic illustration of the pressure air source control.
Figure 2:
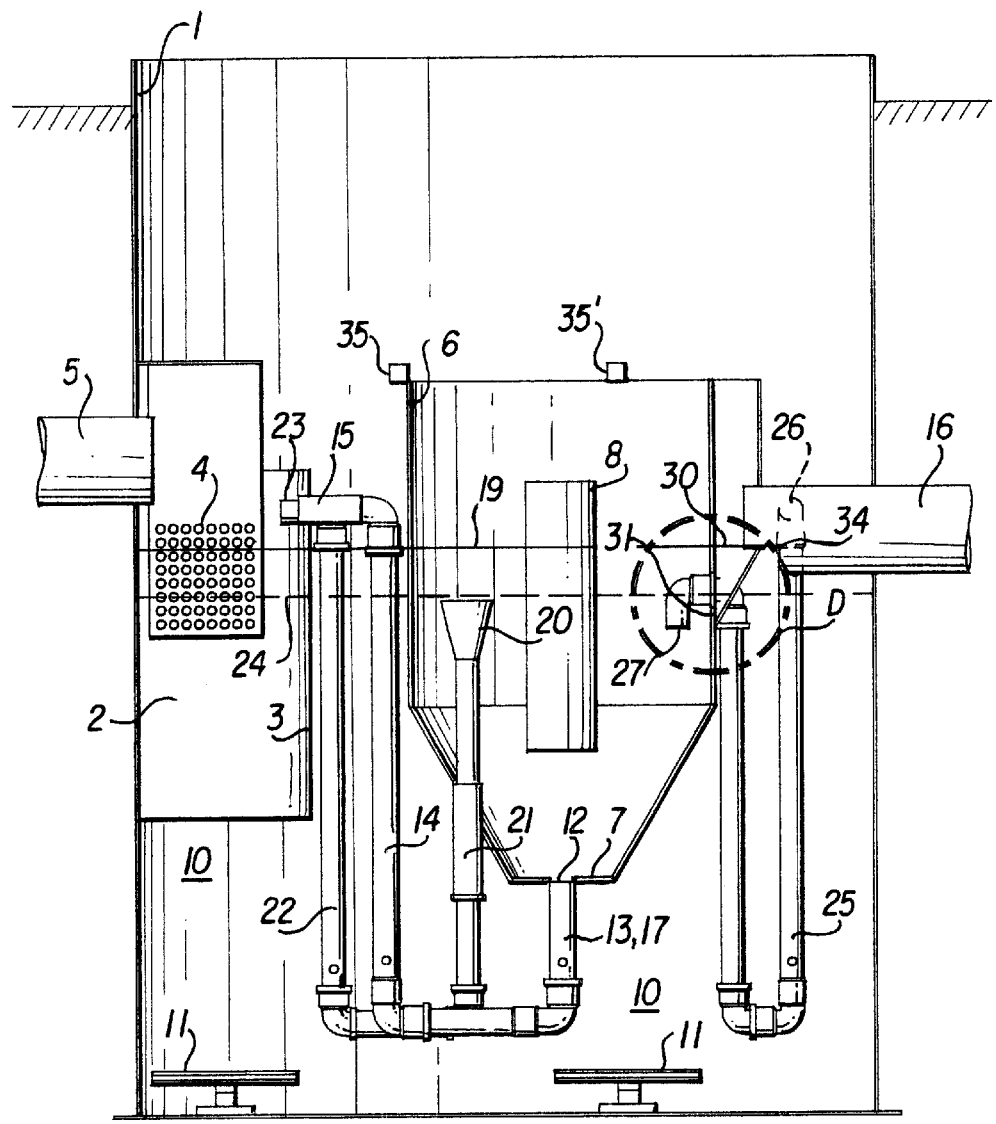
FIG. 2 shows a section of the sewage treatment plant indicated in FIG. 1 in the A—A section.

The purified sewage withdrawal 16 with its inlet part is mouthed into the outlet space 30 of the purified sewage that is, as shows FIG. 4, delimited both by the part of the feeding tank wall 6 in which the passage 31 is made and by the slanting wall 32 and the side walls 33, 33', see FIG. 1. The mentioned part of the feeding tank wall 6 has a function of the dipping wall the lower edge of which is destined by the upper edge of the passage 31. The lower edge of the purified sewage withdrawal 16 delimites with its spillway 34 the height of the operating level 19. Behind the spillway 34 the pump outlet 26 of the pump 25 is mouthed into the purified sewage withdrawal 16 for lowering the operating level.

As already mentioned, the source of intensive stirring 17, the recirculation sludge pump 14, the suction pump 22, and the pump 25 for lowering the operating level 19 are connected with independent pressure air inlets to the air distributor 18 that is pneumaticly connected to the pressure air source 28 that is together with the air distributor 18 controlled by the control unit 29 that is programmable and adapted for control of the function of the mentioned air-lift pumps.

The feeding tank with the other adjoined and described embedment is made as an assembly group fastened on the supports 35, 35' fitted in the tank 1 what is advantageous from the point of view of manufacture, assembling and repairs of the equipment.

The method of sewage biological purification and the equipment function are as follows.

The purified sewage enters through the admission 5 into the sewage treatment plant where it is first of all mechanically pre-treated in the basket for mechanical pre-treatment 4, then it passes into the activation space 10 where it is subjected to the process of biological removal of impurities with activated sludge and according to the pollution character and required resulting parameters of purified sewage this process can pass under aerobic, anoxidic, anaerobic conditions or their combinations. From the activation space 10 the purified sewage passes through the feed adapter 9 and the feed roll 8 into the feeding tank 6 where the sludge is separated by sedimentation from purified water that is carried away from the sewage treatment plant through the purified sewage withdrawal 16. Sedimented sludge is pumped through the sludge pipeline 13 by the operation of the recirculation sludge pump 14 into the inlet zone 2 and it comes back to the activation space 10 where it takes part in intensification of the process of biological removing of the pollution of purified sewage flowing through the admission of the raw sewage 5 into the sewage treatment plant.

Reduction of the amount of undesirable floating impurities and sludge in the upper area of the feeding space in the feeding tank 6 can be realized as a rule in two phases.

In first phase that takes a place preferably in the period of minimum running of purified sewage in the sewage treatment plant, i.e. in the night time, the control unit 29 gives a command according to the set programme for putting the pump 25 into operation for the determined time of pumping.

The pump 25 pumps off a part of purified sewage from the feeding tank 6 into the purified sewage withdrawal 16 what rather quickly decreases the operating level 19 in the sewage treatment plant to the level of the lowered level 24.

This single pumping off the part of the feeding tank 6 content creates a reserve volume in the sewage treatment plant that secures that during the following second phase of reduction of the amount of floating impurities and during stabilization of the purifying process following this second phase no undesirable draining from the sewage treatment plant will take place and thus nor to worsening its purification effect.

The second phase is running immediately after finishing the first phase, i.e. after the pump 25 having achieved the lowered level 24 stops and the source of intensive stirring 17 of the feeding tank 6 content is put into operation what lasts a short time comparatively. In the described case this source 17 is the air-lift pump integrated in the sludge pipeline 13 controlled by the control unit 29 and filled up with air by the pressure air source 28 by means of the air distributor 18. During this intensive stirring the layer of the float out activated sludge and floating impurities is quickly interrupted. The gaseous phase that holds the float out activated sludge on the level of the feeding tank 6 is mixed off and liberated at the same time. The floating impurities are also separated from the float out activated sludge.

In the described system of sewage purification when for sedimentation of the activated sludge is used the vertical feeding tank 6 in this way also the content of the feed roll 8 in the feeding tank 6 is intensively stirred what also considerably reduces the amount of matters that is necessary to remove from the feed roll 8.

After this second phase it is suitable, after the partial sedimentation of the activated sludge in the feeding tank 6 and floating out of floating impurities, to introduce into the process an another phase consisting in sucking off the floating impurities from the level of the feeding tank 6 outside this tank. This is done in such a way that at a command of the control unit 29 the suction pump 22 is put into operation the suction branch 20 of which will suck off these undesirable impurities from the still lowered level 24 of the feeding tank 6 and it will carry them in the inlet zone 2. Then the suction pump 22 stops and the sewage treatment plant turns to the stabilized system of purification.

The above described method and the equipment make possible to minimize the necessity of the feeding tank attendance from the point of view of removing the floating impurities and the activated sludge and also to considerably improve the function and parameters of the biological sewage treatment plant.

The described application of the method according to the invention and the equipment for its execution is not limited by any means to the above described example. It is possible also in sewage treatment plants where individual functional spaces or points are not associated in one common tank.

List Of Indices

1 tank
2 inlet zone
3 dipping wall
4 basket for mechanical pre-treatment
5 admission of the raw sewage
6 feeding tank
7 bottom
8 feed roll
9 feed adapter
10 activation space
11 aerating elements
12 opening
13 sludge pipeline
14 recirculation sludge pump
15 outlet branch
16 purified sewage withdrawal
17 source of intensive stirring
18 air distributor
19 operating level
20 suction branch
21 suction pipe
22 suction pump
23 suction pump outlet
24 lowered level
25 pump
26 pump outlet
27 inlet
28 pressure air source
29 control unit
30 outlet space
31 passage
32 slanting wall
33, 33' side walls
34 spillway
35, 35' supports

What is claimed is:

1. A method of biological sewage purification comprising:

mechanically pretreating of the sewage including passing through a purification process of biological removal of pollution with activated sludge and under aerobic and/or anoxidic and/or anaerobic conditions;

separating the mixture of purified water and activated sludge by sedimentation, such that the activated sludge is returned to the purification process and the purified water is pumped off at determined time intervals; and interrupting the separating step with intensive stirring, whereafter the separating step continues.

2. The method as claimed in claim 1, wherein the quantity of purified water pumped off in determined time intervals corresponds approximately to an expected spasmodic feeding of purified sewage introduced into the purification process during the time of pumping off of sewage from a feeding space, intensive stirring, and subsequent stabilization of the purification process.

3. The method as claimed in claim 1, further comprising sucking off floating impurities from the separated sewage.

4. The method as claimed in claim 3, further comprising, recirculating the sucked off floating impurities to the purification process.

5. The method of biological sewage purification of claim 4, wherein the sucking off and reintroducing occur during the interruption of the separating step.

6. The method of biological sewage purification of claim 1, wherein said interrupting step includes injecting air upwardly, in a direction counter flow of the activated sludge.

7. The method of biological sewage purification of claim 1, wherein the time period during which the separating step occurs is greater than the time period in which the interrupting occurs.

8. A biological sewage purification system, for performing the steps of mechanically pretreating of the sewage including passing through a purification process of biological removal of pollution with activated sludge and under aerobic and/or anoxidic and/or anaerobic conditions; separating the mixture of purified water and activated sludge by sedimentation, such that the activated sludge is returned to the purification process and the purified water is pumped off at determined time intervals; and interrupting the separating step with intensive stirring, whereafter the separating step continues, the system comprising:

- a vessel, having an inlet zone and an activation space;
- a feeding tank having a bottom located inside the vessel;
- a basket in the inlet zone, for performing the mechanical pretreatment with a preconnected inlet of purified sewage, the basket including aerating elements;
- a feed roll connected by a feed adaptor to the activation space; and
- a recirculation sludge pump for pumping the activated sludge from the bottom of the feeding tank to the inlet zone adapted to remove the purified sludge;
- wherein the feeding tank (6) is connected, either directly or indirectly, to a source of intensive stirring (17), the feeding tank (6) is also connected to a pump (25) for lowering an operating level, the pump (25) having an outlet (26) in fluid communication with a withdrawal (16) of the feeding tank (6), and the feeding tank further includes a suction branch (20), arranged for sucking off floating impurities from the lowered operating level (24), connected to a suction pump (22) whose outlet is connected to above the level of the inlet zone (2).

9. The system as claimed in claim 8, wherein the pump (25) for lowering the operating level, the source of intensive stirring (17) of the feeding tank (6) content, the suction pump (22), and the recirculation sludge pump (14) are designed as air-lift pumps.

10. The system as claimed in claim 9, wherein the source of intensive stirring (17) of the feeding tank (6) content, the recirculation sludge pump (14), the pump (25) for lowering the operating level (19), and the suction pump (22) are connected to the air distributor (18) connected with the pressure air source (28), and, comprising a programmable control unit (29) for controlling the air distributor (18) and the pressure air source (28).

11. The system as claimed in claim 8, wherein the inlet zone (2) in which the basket for mechanical pre-treatment (4) is arranged is spacially delimited by a dipping wall (3).

12. The system as claimed in claim 8, wherein an inlet part of withdrawal (16) of purified sewage opening into an outlet space (30) of a spillway (34) is made to limit the height of the operating level (19) behind which the pump outlet (26) of the pump (25) for lowering the operating level (19) is in communication with the withdrawal (16), and outlet space (30) is defined by a part of a jacket of the feeding tank (6) equipped with a passage (31), a slanting wall (32) and side walls (33), (33').

13. The system as claimed in claim 8, wherein the source of intensive stirring (17) of the feeding tank (6) content, the recirculation sludge pump (14), the pump (25) for lowering the operating level (19), and the suction pump (22) are connected to an air distributor (18) with a pressure air source (28) the air distributor (18), and, comprising a programmable control unit (29) for controlling and the pressure air source (28).

14. The system of claim 8, wherein the source of intensive stirring (17) is a means for injecting air upwardly into the outlet (26), in a direction counter to flow of the activated sludge.

15. The system of claim 8, wherein the suction branch (20) is horizontal.

* * * * *